G. H. CURTISS.
LANDING GEAR FOR AIRCRAFT.
APPLICATION FILED APR. 27, 1917.
1,246,020.
Patented Nov. 6, 1917.
2 SHEETS—SHEET 1.
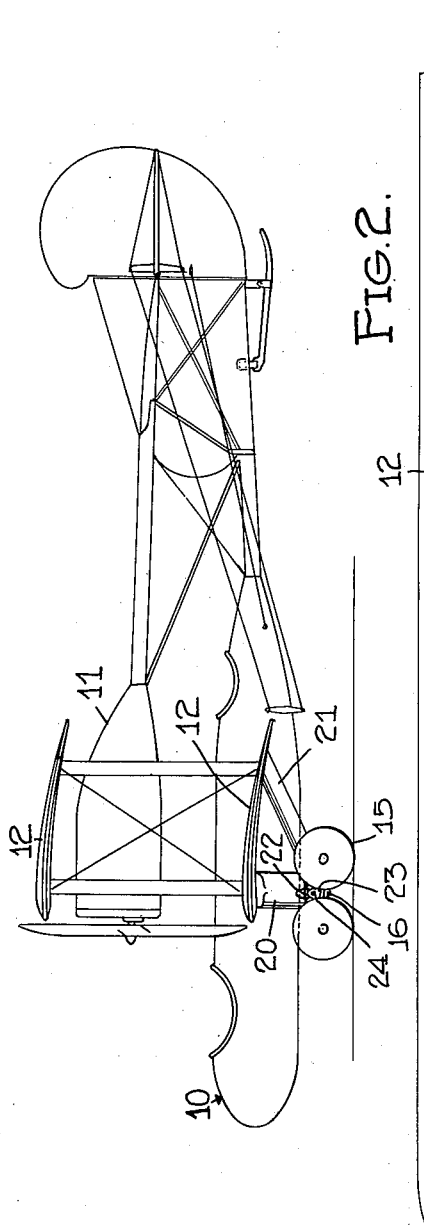
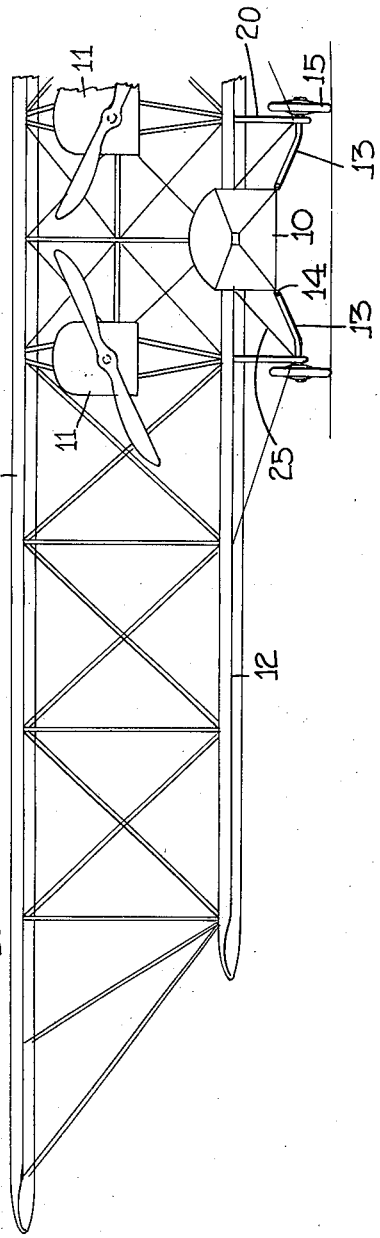
Inventor
GLENN H. CURTISS
By
Attorney G. H. CURTISS.
LANDING GEAR FOR AIRCRAFT.
APPLICATION FILED APR. 27, 1917.
1,246,020.
Patented Nov. 6, 1917.
2 SHEETS—SHEET 2.
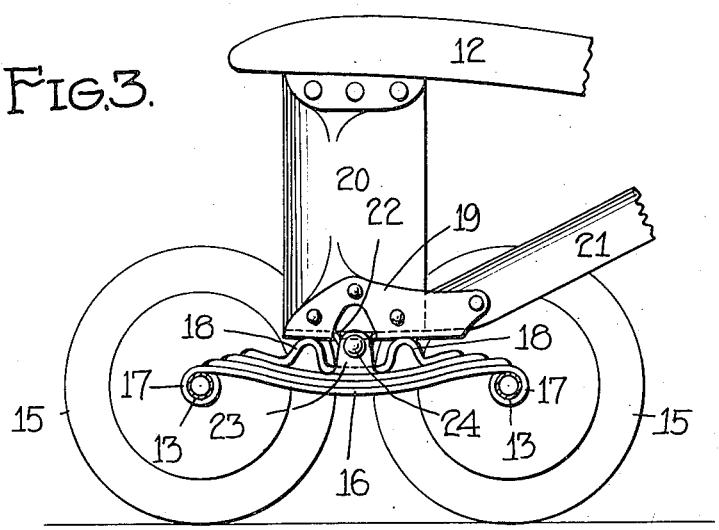
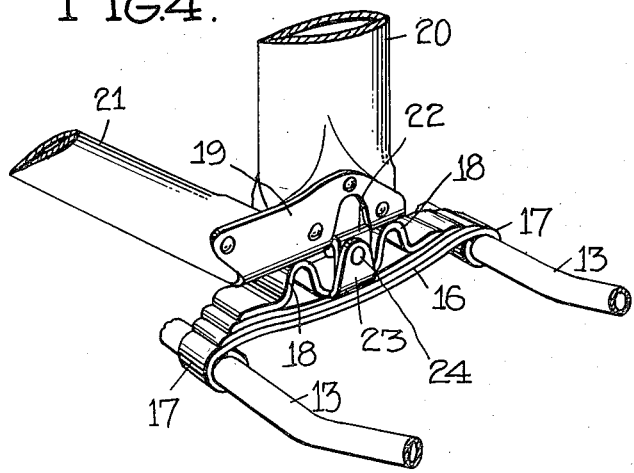
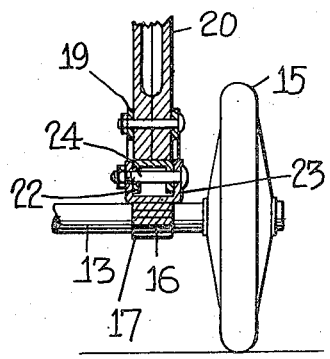
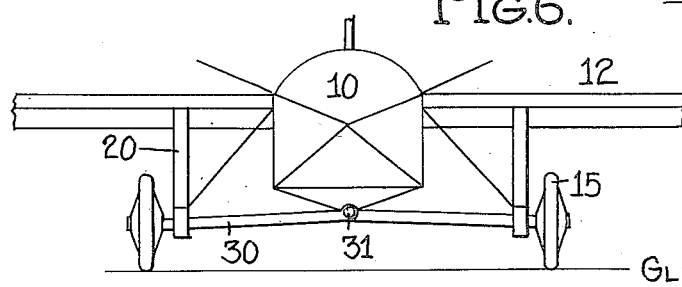
Inventor
GLENN H. CURTISS
By
John P. Tarbox
Attorney

UNITED STATES PATENT OFFICE.

GLENN H. CURTISS, OF BUFFALO, NEW YORK, ASSIGNOR TO CURTISS AEROPLANE AND MOTOR CORPORATION, A CORPORATION OF NEW YORK.

LANDING-GEAR FOR AIRCRAFT.

1,246,020.

Specification of Letters Patent.

Patented Nov. 6, 1917.

Original application filed July 14, 1915, Serial No. 39,836. Divided and this application filed April 27, 1917. Serial No. 164,904.

*To all whom it may concern:*

Be it known that I, GLENN H. CURTISS, a citizen of the United States, residing at Buffalo, in the county of Erie and State of New York, have invented certain new and useful Improvements in Landing-Gear for Aircraft, of which the following is a specification.

My invention relates to landing gear for aircraft. The characteristic of the invention is set forth in an application filed July 14, 1915, Serial No. 39,836, of which the present application is a division. The principal object of the invention is the production of a landing gear through the use of which landing may be made upon broken or extremely rough ground without damage to the machine or discomfort to the flying crew.

A landing gear in order to attain this object must necessarily be of very sturdy construction. This very fact has heretofore been a drawback, inconsistent as it may seem, for the reason that when the structure is made sufficiently strong to stand up under the severe strains imposed upon it, the proper articulation and yielding connection of the various parts for the introduction of equalizing connections between the wheels becomes more difficult. By my invention I have obtained this latter end without any sacrifice whatsoever in strength and sturdiness. Moreover, resistance during flight through the air is minimized and the landing gear adapted to the larger and heavier types of aircraft wherein multiple motors are provided.

In its broad aspect the invention is characterized by a relatively broad wheel base. The landing gear wheels are arranged, two at each side of the longitudinal axis of the machine, with the wheels at opposite sides in tandem. Equalizing connections common to the wheels in pairs together with articulated connections which extend out laterally from the body of the craft constitute the preferred wheel mounting. The wheels, in pairs, preferably underlie the motors.

Of the drawings, wherein like characters of reference designates like or corresponding parts:

Figure 1 is a side elevation of a twin motored aeroplane equipped with the landing gear of my invention;

Fig. 2 is a half front elevation of the aeroplane;

Fig. 3 is a longitudinal sectional view of the landing gear;

Fig. 4 is a detail perspective view of one of the equalizing connections together with that portion of the landing gear in the immediate vicinity thereof;

Fig. 5 is a vertical sectional view of that portion of the landing gear illustrated in Fig. 4, and Fig. 6 is a front elevation of the modification.

In the embodiment of the invention selected for illustration, 10 designates the nacelle body of the craft, 11—11 the twin motors and 12—12 the supporting surfaces; the craft being of the twin screw tractor type with its power units arranged symmetrically at opposite sides of the fore and aft axis and in a horizontal plane above that of the nacelle.

Axle members 13 extend out laterally in tandem pairs from the sides of the nacelle 10. These axle members are hinged at their inner ends as indicated at 14 to the nacelle body whereby their outer ends may partake of movement in vertical planes. Tandem or following wheels 15 are mounted in pairs on the outer ends of the axles, the wheels at each side of the nacelle being herein referred to as the wheels constituting the respective pairs.

An equalizing member 16 interconnects the tandem wheels. The form of this member is best illustrated in Figs. 3 and 4. As shown it is a flexible laminated bow spring whereby the equalizing connection becomes also a yielding connection. The laminations are preferably of varying length, the base lamination being longest and the top lamination shortest. Said base lamination is terminally rolled-in as indicated at 17 to embrace respectively the axle members 13 which support the wheels 15, the axle members in each instance underlying approximately the outer end of the lamination next above the base lamination of the spring. The top lamination of the spring is symmetrically arched as at 18 at points at opposite sides of its center and equidistant respectively from its ends. These arched portions bear directly against a bearing plate 19 carried at the extremity of a pillar support 20 dependent from the lower supporting plane 12. Said pillar support together with a diagonal extending brace 21 provides in effect a substantially V-strut, by many considered the best type of landing gear strut yet evolved. The bearing plate or fitting 19 is equipped with opposed down-turned ears 22 and the top lamination of the bow spring with opposed upturned ears 23. Said ears are substantially complemental (see Fig. 5) and with a pivot pin 24 provide the pivotal support for the tandem wheels. The pivot axis, in each instance, lies intermediate the ends of the bow springs 16 and directly beneath the pillar strut 20. Furthermore, the lower end of each pillar strut is convexed (the fitting 19 being complemental) and bears against the arched portions 18 and its associated bow spring 16. The location of the pillar supports is such that the thrust of the landing gear is transmitted directly to the main structure of the machine. Preferably, the pillar supports 20 are joined at their upper ends to the front main beam (not shown) of the lower supporting surface, while the upper ends of the diagonal braces 21 are joined to the rear beam thereof. In the vertical plane of the pillar supports the motors or power units 11 are arranged, hence the weight masses of the respective motors are thus borne directly by the tandem wheels, the wheels, as shown, approximately underlying the power units. Strong cross wiring 25 is provided between the pillar supports 20 and the sides of the nacelle.

In operation as the machine is started from the ground into the air or alights upon the ground from the air, the tandem wheels take up directly the impact of landing, the heavy masses of the driving motors being directly imposed upon them, the body structure being midway between the pairs on opposite sides of the machine. The equalizing connections or bow springs 16 between the wheels equalize the load upon the individual wheels of the pairs, each wheel moving with its axle and the pairs together having oscillatory movement about the points of rocking or pivotal connection with the pillar supports 20 (see 24) as they pass over small or large obstructions. By virtue of this connection the machine is of an extremely easy riding nature on landing but of far more value than that is the freedom of shocks to vital parts and the extreme sturdiness of the gear itself. Because the wheels are following or tandem they present a minimum head resistance per pair. The arched portions 18 of the top lamination of the bow spring 16 prevent contact of the spring proper with the fitting 19. Otherwise, equalizing motion could not be produced. The articulated connections are such that the landing gear parts act independently, the one part acting principally as a support for one motor unit and the other part principally as a support for the other.

In Fig. 6 I have disclosed a modified form of landing gear which differs from the form of Figs. 1-5 inclusive principally in that the axle members 30 are carried to a point near the central plane of the nacelle and pivoted as at 31 to an outward extension therefrom instead of to the bottom outside edges. In the preferred type of landing gear the axle members 13 are bent intermediate their ends while in a modified type of landing gear the axle members are straight or unbent throughout. In other respects the landing gear devices are identical.

Although I have described more or less precise forms and details of construction, I do not intend to be understood as limiting myself thereto as I contemplate changes in form, the proportion of parts and the substitution of equivalents as circumstances may suggest or render expedient and without departing from the spirit of the invention as claimed.

What is claimed is:

1. In an aeroplane, in combination, main supporting surfaces, motor units disposed symmetrically at opposite sides of the fore and aft axis of the craft, a centrally located body, tandem wheels arranged symmetrically beneath said surfaces constituting a running gear, the tandem wheels at opposite sides of said axis directly underlying the respective motor units, and articulated connections between the tandem wheels and said central body.

2. In an aeroplane, in combination, main supporting surfaces, motor units disposed symmetrically at opposite sides of the fore and aft axis of the craft, a centrally located body, tandem wheels arranged symmetrically beneath said surfaces constituting a running gear, the tandem wheels at opposite sides of said axis approximately underlying the respective motor units, and equalizing connections between the respective tandem wheels.

3. In an aeroplane, in combination, main supporting surfaces, pairs of tandem wheels symmetrically disposed at opposite sides of the fore and aft axis of the craft, separate strut supports for the respective pairs of wheels, rigid connections between said strut supports and the supporting surfaces, a centrally located body, and articulated connections between said wheels and said central body.

4. In an aeroplane, in combination, main supporting surfaces, pairs of tandem wheels symmetrically disposed at opposite sides of the fore and aft axis of the craft, V-struts secured to the supporting surfaces for the individual support of the respective pairs of wheels, and an equalizing member secured to each V-strut for equalizing the load upon the wheels of the tandem pairs.

5. In an aeroplane, in combination, motor units arranged symmetrically at opposite sides of the longitudinal axis of the craft, supporting surfaces, a nacelle body, outrigged axles carrying wheels spaced from the sides of said nacelle body and in vertical alinement with the respective motors, and shock absorbing means intermediate the axles and the supporting surfaces above them.

6. In a landing gear for aircraft, tandem wheels arranged in pairs at opposite sides of the craft, pivoted axle members individually supporting the respective wheels, equalizing members connecting the axle members in pairs, and separate supports for the respective equalizing members.

7. In a landing gear for aircraft, separate V-strut supports, an equalizing member mounted at the foot of each support, outrigged axle members terminally supported by said equalizing members, wheels mounted upon said axle members, and means spacing the equalizing members from the supports.

8. In a landing gear for aircraft, tandem wheels arranged in pairs at opposite sides of the craft, outrigged axle members individually supporting the respective wheels, equalizing members terminally interconnecting the outrigged axles, means rigidly supporting the equalizing members from above, and means conjointly functioning as an element of the equalizing member and as a means for spacing said member from its rigid support.

In testimony whereof I hereunto affix my signature.

GLENN H. CURTISS.